UNITED STATES PATENT OFFICE.

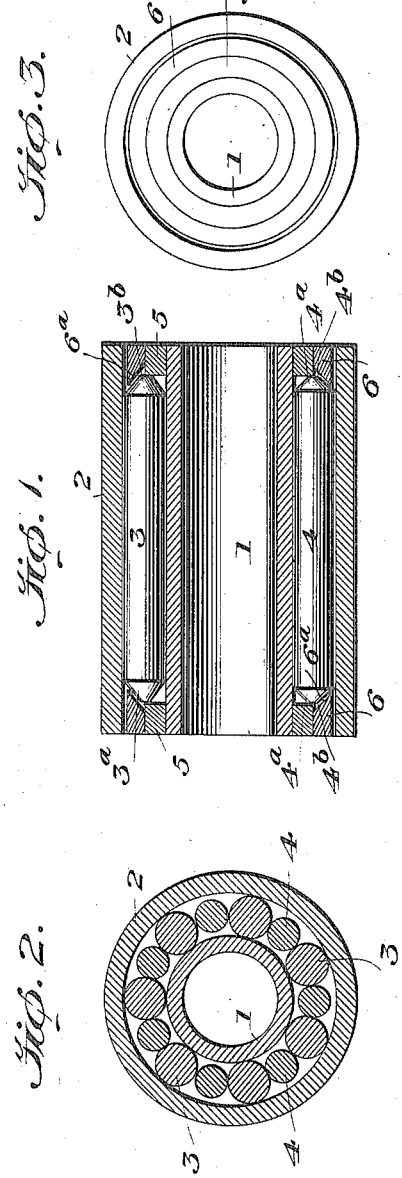

RUTHERFORD G. GOLDMAN, OF LOS ANGELES, CALIFORNIA.

ROLLER-BEARING.

1,286,288.　　　　　　Specification of Letters Patent.　　　Patented Dec. 3, 1918.

Application filed December 19, 1917. Serial No. 207,930.

*To all whom it may concern:*

Be it known that I, RUTHERFORD G. GOLDMAN, a citizen of the United States, residing at Los Angeles, in the county of Los Angeles and State of California, have invented certain new and useful Improvements in Roller-Bearings, of which the following is a specification.

My invention relates to an improvement in roller bearings.

An object is to provide a bearing in which the outer and inner sleeves, as well as the rollers themselves, are straight, although provided with conical ends, whereby bearing contact and friction are reduced to a minimum; and another object is to provide means for holding both the spacing and bearing rollers in place even when the outer sleeve is removed.

With the foregoing objects in view, my present invention comprises a straight inner and outer sleeve, straight bearing and spacing rollers alternately arranged, the former having tapering ends, and all of which are interposed between the two sleeves, in connection with two retaining rings at each end, the inner of which receives the end thrust of the rollers, and the outer of which forms a slight overhang which prevents the rollers from falling out of place when the bearing is taken apart.

In the accompanying drawing:—

Figure 1 is a longitudinal sectional view;

Fig. 2 is a transverse section; and

Fig. 3 is an end view.

The numerals 1 and 2 represent the inner and outer sleeves of the bearing. These are cylindrical in form, and consequently straight and provide an annular space therebetween.

Bearing rollers 3 approximately fit this space. These are also straight with conical ends $3^a$, the conical formation being preferably slightly truncated as at $3^b$. Interposed between the bearing rollers are spacing rollers 4, also straight but of smaller size than the bearing rollers as shown in Figs. 1 and 2, and having conical ends $4^a$, the conical formation being slightly truncated as at $4^b$.

The rollers are held in place by retaining rings 5 and 6 at either end. These may be held in place by being driven, screwed or pressed on the outer end of the inner sleeve 1, and on each other respectively, or they can be held in place by any other suitable mechanical means.

The inner retaining rings 5 take the end thrust of the rollers, the ends $3^b$ and $4^b$ of the bearing rollers and spacing rollers respectively coming in contact with the inner ends of these retaining rings.

Thus it will be seen that there is an extremely small portion of both bearing and spacing rollers exposed to friction through end thrust.

The outer retaining rings 6 have overhang $6^a$ which extends partly over the conical ends $3^a$ and $4^a$ which prevents all of the rollers from falling out of place when the bearing is pulled apart, and holds the spacing rollers centrally in place between the bearing rollers, as clearly shown in Fig. 2.

In this way, I have provided a simple roller bearing of a minimum number of parts, easily assembled or taken apart, and in which friction of parts is reduced to a minimum.

I claim:

1. A roller bearing containing a straight inner and outer sleeve, straight bearing and spacing rollers alternately arranged in the annular space between these sleeves, the ends of said rollers being conical, and retaining rings secured one within the other in the ends of the spaces between the outer ends of the sleeves, one of which is in position to take the end thrust of the rollers and the other having an overhanging inner edge which extends part way at least over the conical ends of the rollers, thereby confining them.

2. A roller bearing comprising inner and outer cylindrical sleeves having an annular space therebetween, bearing rollers and spacing rollers alternately arranged and located in this annular space, said rollers having truncated conical ends, two retaining rings at each end of the bearing in the space between sleeves secured to each other and to one of the sleeves, one of said rings having a right-angular inner surface which receives the truncated ends of the rollers and takes the end thrust thereon, and the outer retaining rings having an overhanging inner edge which extends part way at least over the tapering conical ends of the rollers.

In testimony whereof I affix my signature.

RUTHERFORD G. GOLDMAN.